UNITED STATES PATENT OFFICE.

VALENTINE DOANE, OF HARWICH, MASSACHUSETTS, ASSIGNOR TO FRED V. DOANE, OF SAME PLACE.

INSECTICIDE.

SPECIFICATION forming part of Letters Patent No. 599,056, dated February 15, 1898.

Application filed February 13, 1897. Serial No. 623,297. (No specimens.)

*To all whom it may concern:*

Be it known that I, VALENTINE DOANE, a citizen of the United States, residing at Harwichport, in the county of Barnstable and State of Massachusetts, have invented a new and useful composition of matter to be used for killing insects on plants and at the same time stimulating the growth of the plants upon which it is so used, of which the following is a specification.

My invention relates generally to compositions known as "insecticides," and though it may be adapted to general use for the destruction of any form of insect life the primary object of my invention is the destruction of the class of insects known as "cranberry-worms," meaning the three divisions of a family of insects peculiar to cranberry-vines, known, respectively, as the "bud-worm," the "fire-worm," and the "fruit-worm." These insects, practically unknown on any other form of vegetation, abound wherever the cranberry is cultivated for a considerable length of time, and their ability to destroy the cranberry-vines or the fruit, if vines escape them, is almost incredible. The flooding of the bogs where the cranberry is cultivated at the proper times affords some protection against the ravages of these insects; but as not more than twenty per cent. of the grounds under cultivation for this fruit can be flooded with water at will an artificial remedy is essential to success with a large majority of the cultivators of this fruit. Poison in various forms has long been used for destroying these insects, with varying results; but the danger arising from its use, especially by ignorant workmen, and the fact that it has no stimulating effect whatever upon vegetable growth nor certainty of effect in destroying insects, make it both unreliable and unsatisfactory as it is now prepared. By my invention these objections are overcome. My improved composition, which may be called a "fertilizing insecticide," not only destroys the insects, but from its nature stimulates and strengthens the vine and tends to promote the health and growth of the fruit.

While the composition compounded in accordance with my invention may comprise various ingredients, I prefer to use the following—namely, potash, chlorin, and some forms of poison. The potash and chlorin are obtainable in commerce in various forms and chemical associations; but experience leads me to choose nitrate of potash as my source of potash and either kainite or sylvine as my source of chlorin, which may also be obtained from common salt. While any active poison may be used for my purpose, I prefer to use white arsenic, as this is soluble in water and held in solution without difficulty, thereby permitting an even distribution of the poison with the other elements of the solution on the vines. As the cranberry-vine is one of the most hardy forms of vegetable life, a much stronger solution poisonously impregnated can be used on this vine than on other forms of vegetation. Hence my compound is prepared, primarily, for use on this particular form of vegetation. For use on other kinds of vegetable life, potato-vines, fruit or shade trees, &c., it must be reduced in its strength by the increase of water in the solution, say fifty per cent. for ordinary purposes.

It will be understood that in speaking of nitrate of potash as my preferred source of potash I have reference to the commercial potassium nitrate, also known as "niter" and "saltpeter," which is a well-known fertilizing agent, and ordinarily contains as an impurity a small proportion of the fertilizing ingredient phosphoric acid.

I find a desirable proportion of the ingredients to be as follows: ten to twelve pounds of kainite or sylvine, four pounds nitrate of potash, and three to four pounds of white arsenic, and in rare cases or for special conditions three pounds of nitrate of soda may be added as an extra stimulant. These ingredients are put up together in sacks, the contents of each sack to be dissolved in fifty gallons of water (for cranberry-vines) and applied with a spraying-pump to the vines.

The cultivation of cranberries being the principal agricultural industry in Barnstable and Plymouth counties of Massachusetts, where a full average yield is ordinarily worth more than one million dollars annually to the growers and helpers in this business in these two counties alone, and the fact that New Jersey and several States in the middle West have large tracts of land within their borders under cultivation or devoted to the growing of this fruit, throws some light on the value of this industry and the importance of its protection.

My invention, though containing a percentage of active poison, is so thoroughly mixed with harmless ingredients that danger from its use with ordinary care is reduced to a minimum, and the cost of my compound being nearly fifty per cent. less than other expedients which have been used for the purpose brings it within easy reach of all who need a sure and safe remedy for insects.

I am aware that poisonous compositions having fertilizing properties are not new in the art, and I do not claim such a composition, broadly.

I claim—

1. The herein-described composition of matter, to be used for destroying cranberry-insects, consisting of kainite, nitrate of potash, and white arsenic, the kainite being in excess of the other ingredients.

2. The herein-described composition of matter, to be used for destroying cranberry-insects, consisting of kainite, an alkali nitrate, and a mineral poison such as specified, the kainite being in excess of the other ingredients.

In testimony whereof I have signed my name to this specification, in the presence of two subscribing witnesses, this 10th day of February, A. D. 1897.

VALENTINE DOANE.

Witnesses:
C. F. BROWN,
A. D. HARRISON.